United States Patent
Lo et al.

(10) Patent No.: US 7,671,955 B2
(45) Date of Patent: Mar. 2, 2010

(54) LIQUID CRYSTAL DISPLAY PANEL AND PIXEL ARRAY STRUCTURE THEREOF

(75) Inventors: Cheng Lo, Hsinchu (TW); Chih-Jen Hu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 183 days.

(21) Appl. No.: 11/840,990

(22) Filed: Aug. 19, 2007

(65) Prior Publication Data

US 2008/0316412 A1 Dec. 25, 2008

(30) Foreign Application Priority Data

Jun. 23, 2007 (TW) .............................. 96122782 A

(51) Int. Cl.
*G02F 1/1343* (2006.01)
(52) U.S. Cl. ........................... 349/143; 349/43; 349/56; 349/84; 349/139
(58) Field of Classification Search .................. 385/139, 385/41, 42, 43, 56, 73, 74, 80, 82, 84, 97, 385/104, 106, 122, 140, 141, 143, 144, 149, 385/155, 156, 157, 166, 129
See application file for complete search history.

(56) References Cited

U.S. PATENT DOCUMENTS

| | | | |
|---|---|---|---|
| 6,100,953 A | 8/2000 | Kim et al. | 349/129 |
| 6,441,873 B2 * | 8/2002 | Young | 349/43 |
| 6,573,965 B1 * | 6/2003 | Liu et al. | 349/129 |
| 6,587,173 B2 | 7/2003 | Yoo et al. | 349/129 |
| 6,593,982 B2 | 7/2003 | Yoon et al. | 349/106 |
| 6,611,308 B2 | 8/2003 | Wu et al. | 349/129 |
| 7,087,929 B2 | 8/2006 | Maeda | 257/59 |
| 2003/0011734 A1 | 1/2003 | Liu et al. | 349/129 |
| 2004/0263738 A1 * | 12/2004 | Jin | 349/129 |

(Continued)

FOREIGN PATENT DOCUMENTS

CN 1482499 3/2004

(Continued)

OTHER PUBLICATIONS

Article titled "Two-Domain TN-LCDs Fabricated by Parallel Fringe Field Method" jointly authored by Lien et al., SID 93 Digest, pp. 269-272.

(Continued)

*Primary Examiner*—Brian M Healy
(74) *Attorney, Agent, or Firm*—Jianq Chyun IP Office

(57) ABSTRACT

A liquid crystal display (LCD) panel including a first substrate, a second substrate, a liquid crystal layer, and a pixel array structure is provided. The first substrate includes a plurality of scan lines and a plurality of data lines, and the second substrate includes a common electrode. The liquid crystal layer is disposed between the first substrate and the second substrate. The pixel array structure includes a plurality of pixel units and a plurality of protrusions. The pixel units are arranged as an array, and each pixel unit includes an active device and a pixel electrode electrically connected the active device, wherein the pixel electrode has a plurality of electrode sections. The protrusions are substantially located in at least one junction region of the electrode sections. The liquid crystal molecules in the LCD panel have fast response speed and correct arrangement direction.

20 Claims, 13 Drawing Sheets

U.S. PATENT DOCUMENTS

| | | |
|---|---|---|
| 2005/0122452 A1 | 6/2005 | Yoshida et al. ............... 349/114 |
| 2005/0237459 A1 | 10/2005 | Ikeda et al. ................. 349/123 |
| 2006/0033853 A1 | 2/2006 | Lee et al. ..................... 349/42 |
| 2008/0316412 A1* | 12/2008 | Lo et al. ..................... 349/143 |

FOREIGN PATENT DOCUMENTS

| | | |
|---|---|---|
| CN | 1690812 | 11/2005 |
| JP | 2004062196 | 2/2004 |
| TW | I259587 | 8/2006 |

OTHER PUBLICATIONS

Article titled "TFT-Addressed Two-Domain TN VGA Displays Fabricated Using the Parallel-Fringe-Field Method" jointly authored by Lien et al., SID 94 Digest, pp. 594-596.

* cited by examiner

LIQUID CRYSTAL DISPLAY PANEL AND PIXEL ARRAY STRUCTURE THEREOF

CROSS-REFERENCE TO RELATED APPLICATION

This application claims the priority benefit of Taiwan application serial no. 96122782, filed Jun. 23, 2007. All disclosure of the Taiwan application is incorporated herein by reference.

BACKGROUND OF THE INVENTION

1. Field of the Invention

The present invention generally relates to a liquid crystal display (LCD) panel and a pixel array structure thereof, in particular, to an LCD panel having a plurality of protrusions and a pixel array structure thereof.

2. Description of Related Art

Along with the advancement of multi-media technology, liquid crystal displays (LCDs) have become the mainstream of today's display market due to their advantages such as high display quality, high space efficiency, low power consumption, and no radiation, wherein multi-domain vertically alignment (MVA) LCD has wide viewing angle.

Below, the pixel structure of a MVA LCD will be explained. FIGs. 1A-1C illustrate three conventional pixel structures of a MVA LCD panel. First, referring to FIG. 1A, the pixel structure 100A includes an active device 110 and a pixel electrode 120 electrically connected to the active device 110, wherein the active device 110 electrically connects a scan line 130 and a data line 140. In addition, the pixel structure 100A further includes a protrusion 150 which allows the liquid crystal molecules in the LCD panel to be aligned in multi domains so that a wide viewing angle can be achieved. However, the distance d between the edges of the protrusion 150 and the pixel electrode 120 in the diagonal direction of the rectangular pixel electrode 120 is very long; thus, when the pixel structure 100A is driven, the transfiguration of the electric field in the diagonal direction of the pixel electrode 120 is not very obvious, and accordingly it is difficult to control the arrangement direction of the liquid crystal molecules. Thereby, the liquid crystal molecules may not tilt to the correct direction when they are disturbed. For example, when a single point of the LCD panel is pressed and accordingly the liquid crystal molecules are disordered, the liquid crystal molecules at this single point cannot restore their original arrangement in a short time.

To resolve foregoing problem, a slit extended along the diagonal direction of the pixel electrode 120 may be formed as shown in FIG. 1B and FIG. 1C. Referring to FIG. 1B and FIG. 1C, the pixel electrode 120 in the pixel structure 100B has a slit 122 located in the pixel electrode 120, and the pixel electrode 120 in the pixel structure 100C has a slit 124 located at the edge of the pixel electrode 120. The slit 122 and the slit 124 can intensify the electric field in the diagonal direction of the pixel electrode 120 and accordingly increase the response speed of the liquid crystal molecules.

However, in the pixel structure 100B, even though the slit 122 formed in the pixel electrode 120 helps to increase the response speed of the liquid crystal molecules, it may also cause discontinuity in the arrangement of the liquid crystal molecules and accordingly incorrect tilting direction of the liquid crystal molecules when the distance d is too long. In addition, even though the design of the pixel structure 100C can increase the response speed of the liquid crystal molecules and make the liquid crystal molecules to tilt to a correct direction, the design of the slit 124 loses more aperture ratio of the display area of the LCD panel than the design of the slit 122 does. In short, neither of foregoing designs is capable of both improving the display performance of a MVA LCD panel and maintaining a satisfactory aperture ratio of the display area of the MVA LCD panel.

SUMMARY OF THE INVENTION

Accordingly, the present invention is directed to a pixel array structure, wherein the liquid crystal molecules in every pixel unit can have both fast response speed and correct arrangement direction without sacrificing the aperture ratio of a display area.

The present invention is further directed to a liquid crystal display (LCD) panel, wherein the liquid crystal molecules have both fast response speed and correct arrangement direction.

The present invention provides a pixel array structure including a plurality of pixel units and a plurality of protrusions. The pixel units are arranged as an array, and each pixel unit includes an active device and a pixel electrode electrically connected to the active device, wherein the pixel electrode has a plurality of electrode sections. The protrusions are substantially located in at least one junction region of the electrode sections.

The present invention further provides an LCD panel including a first substrate, a second substrate, a liquid crystal layer, and a pixel array structure. The first substrate includes a plurality of scan lines and a plurality of data lines, and the second substrate includes a common electrode. The liquid crystal layer is disposed between the first substrate and the second substrate. The pixel array structure includes a plurality of pixel units and a plurality of protrusions. The pixel units are arranged as an array, and each pixel unit includes an active device and a pixel electrode electrically connected to the active device, wherein the pixel electrode has a plurality of electrode sections. The protrusions are substantially located in at least one junction region of the electrode sections.

According to an embodiment of the present invention, each of the electrode sections is a rectangle.

According to an embodiment of the present invention, each of the electrode sections has a plurality of turning angles, and each turning angle is greater than or equal to 90° and is smaller than 180°.

According to an embodiment of the present invention, each of the protrusions is adjacent to a corner of the electrode section. To be specific, the protrusions may be a plurality of tapered protruding structures. In addition, the protrusions may also be a plurality of cross protruding structures, and each of the cross protruding structures has a vertical portion parallel to the data lines and a horizontal portion interlacing to the data lines.

According to an embodiment of the present invention, the protrusions may be a plurality of tapered protruding structures.

According to an embodiment of the present invention, for each of the pixel units, the protrusions are located in the center of a junction region of two adjacent electrode sections. Here each of the protrusions may be a tapered protruding structure or a protruding bar, wherein the protruding bar may be perpendicular to the data lines or may even cross over the data lines.

According to an embodiment of the present invention, the pixel electrode further has a connecting section for connecting two adjacent electrode sections.

According to an embodiment of the present invention, the electrode sections include transparent electrodes, reflective electrodes, or the combination thereof.

According to an embodiment of the present invention, the number of the electrode sections is N, wherein N is a positive integer greater than 2.

According to an embodiment of the present invention, the LCD panel further includes a plurality of alignment structures disposed on the second substrate, wherein the alignment structures may be respectively corresponding to the centers of the electrode sections.

According to an embodiment of the present invention, the common electrode has a plurality of openings, and the openings are respectively corresponding to the centers of the electrode sections.

According to an embodiment of the present invention, the LCD panel further includes a color filter disposed on the second substrate.

According to an embodiment of the present invention, the scan line corresponding to each of the pixel units is located between two adjacent electrode sections of the pixel unit.

According to an embodiment of the present invention, the LCD panel further includes a plurality of common lines disposed on the first substrate, wherein each of the common lines is correspondingly disposed between two adjacent electrode sections of each of the pixel units.

According to an embodiment of the present invention, each of the pixel electrodes further has a connecting section to connect two adjacent electrode sections of the pixel electrode.

According to the present invention, a plurality of protrusions is disposed in at least one junction region of the electrode sections for intensifying the electric field transfiguration in the diagonal direction of the electrode sections. Thus, in a pixel array structure and a LCD panel provided by the present invention, the liquid crystal molecules in each pixel unit can have both fast response speed and correct arrangement direction. In addition, in the present invention, a good aperture ratio of the display area can be maintained without fabricating a slit in the pixel electrode.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
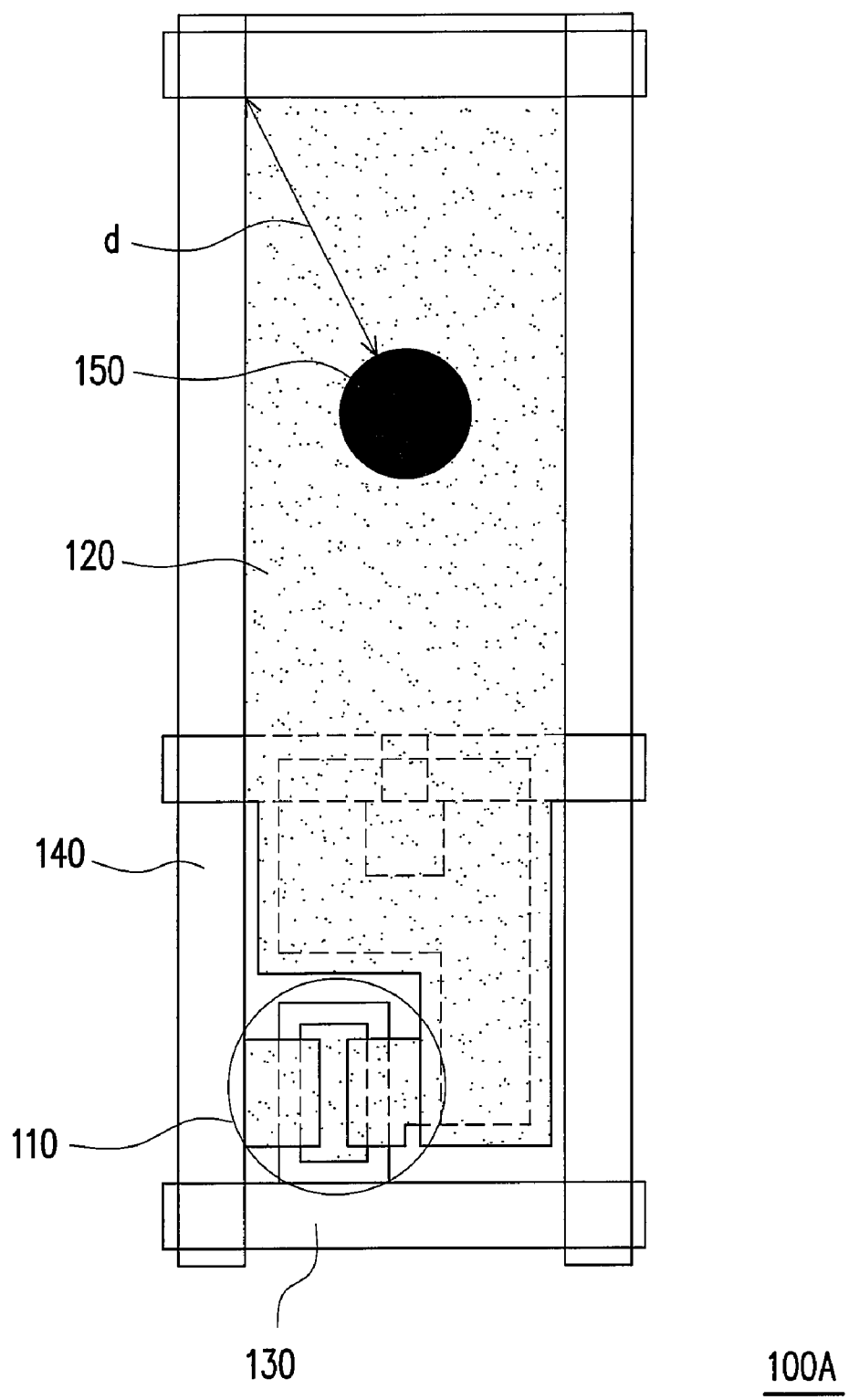
FIGs. 1A~1C illustrate three conventional pixel structures of multi-domain vertically alignment (MVA) liquid crystal display (LCD) panel.
Figure 1B:
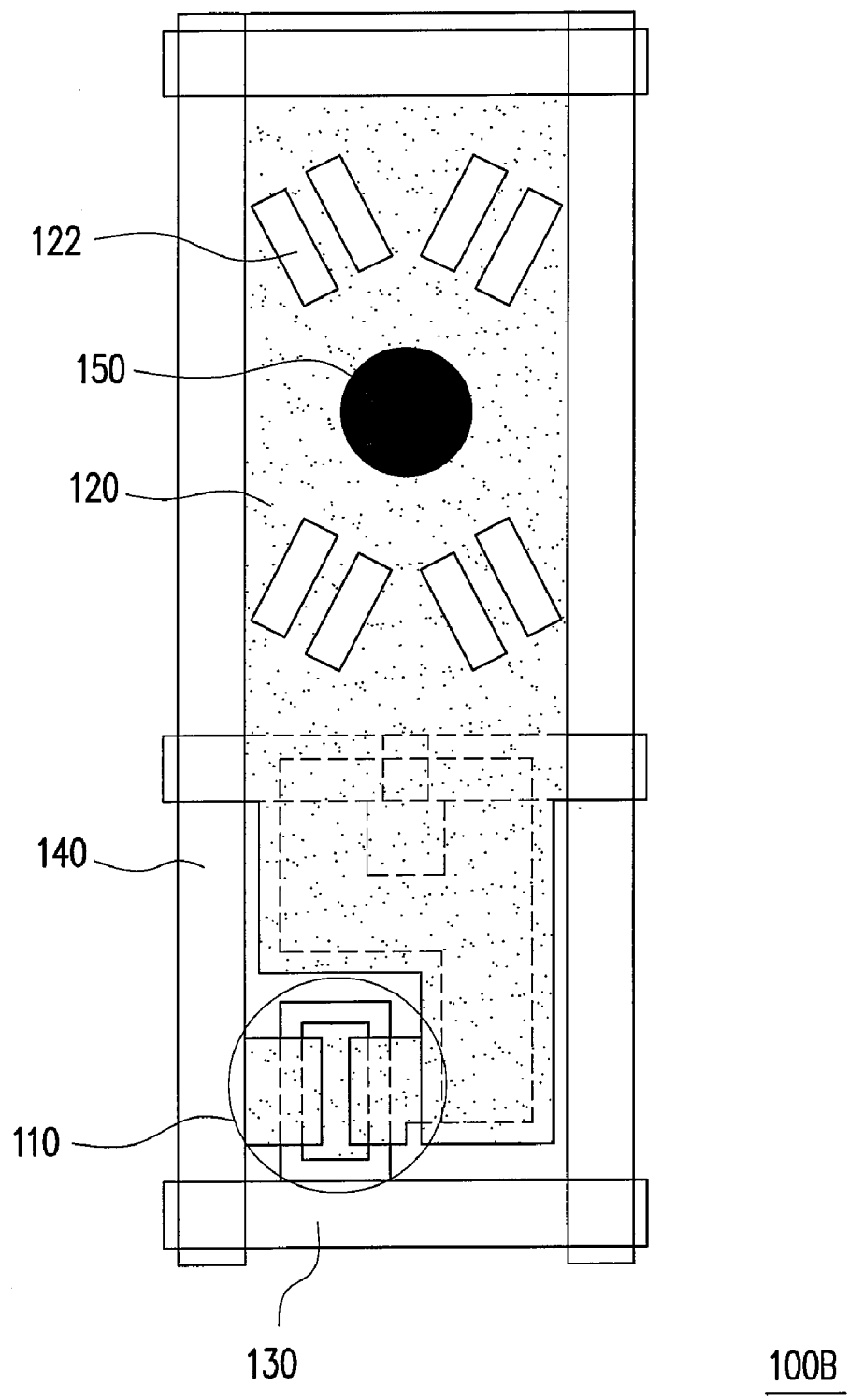
Figure 1C:
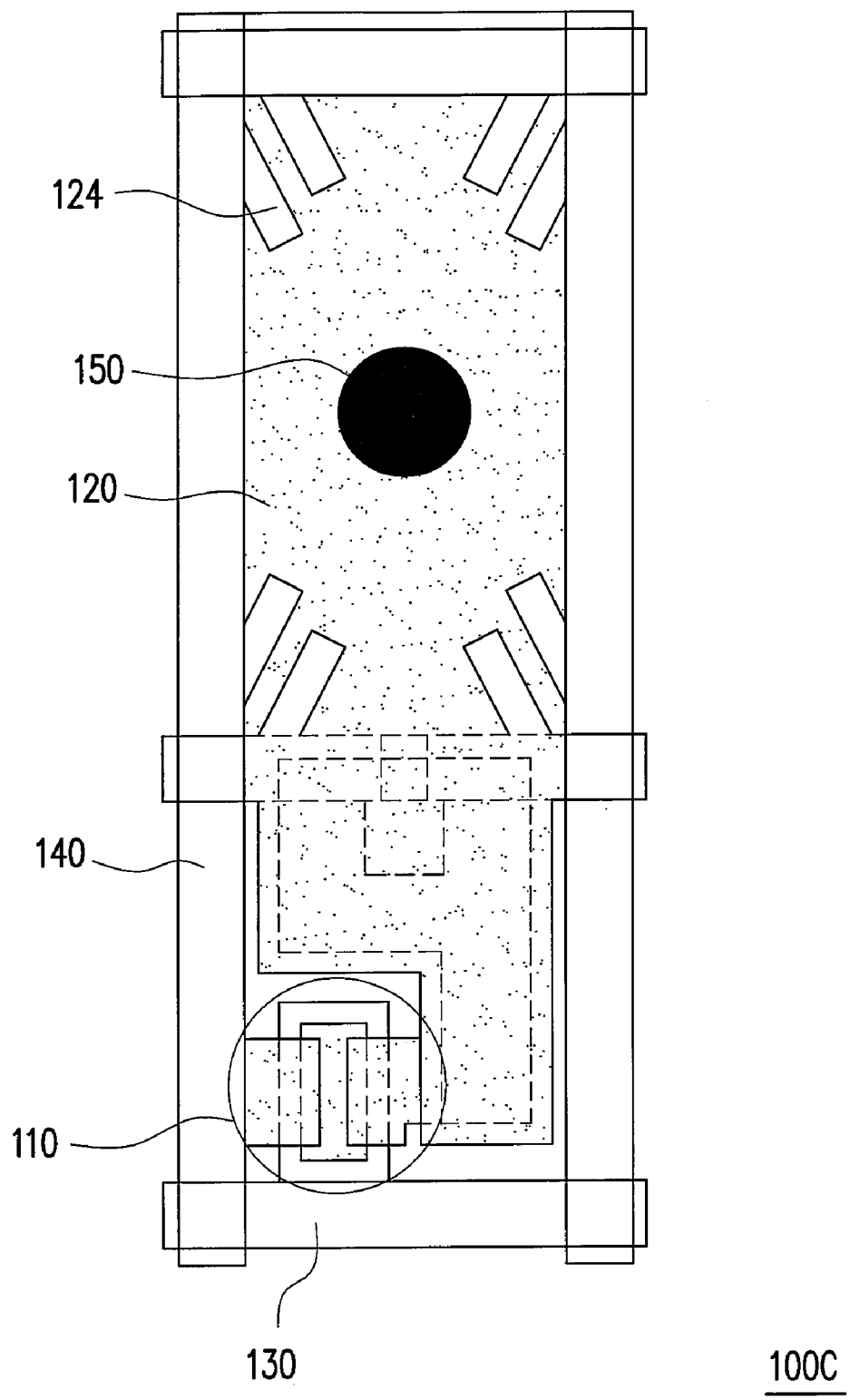

Reference will now be made in detail to the present preferred embodiments of the invention, examples of which are illustrated in the accompanying drawings. Wherever possible, the same reference numbers are used in the drawings and the description to refer to the same or like parts.

In a conventional pixel structure, the liquid crystal molecules in the diagonal direction of a rectangular pixel electrode cannot respond quickly or offer correct arrangement direction. To resolve foregoing problem, the present invention provides a pixel array structure wherein protrusions of different shapes are disposed between adjacent electrode sections so that the liquid crystal molecules can tilt towards a particular direction. Moreover, in the present invention, a single pixel electrode is divided into a plurality of electrode sections. The smaller the distance between the center and the edges of the electrode section is, the intenser the electric field transfiguration in the diagonal direction of the electrode section is, therefore the response speed of the liquid crystal molecules is increased. Below, embodiments of the present invention will be described with reference to accompanying drawings; however, following descriptions are not intended for restricting the scope of the present invention.

First Embodiment

Figure 2A:
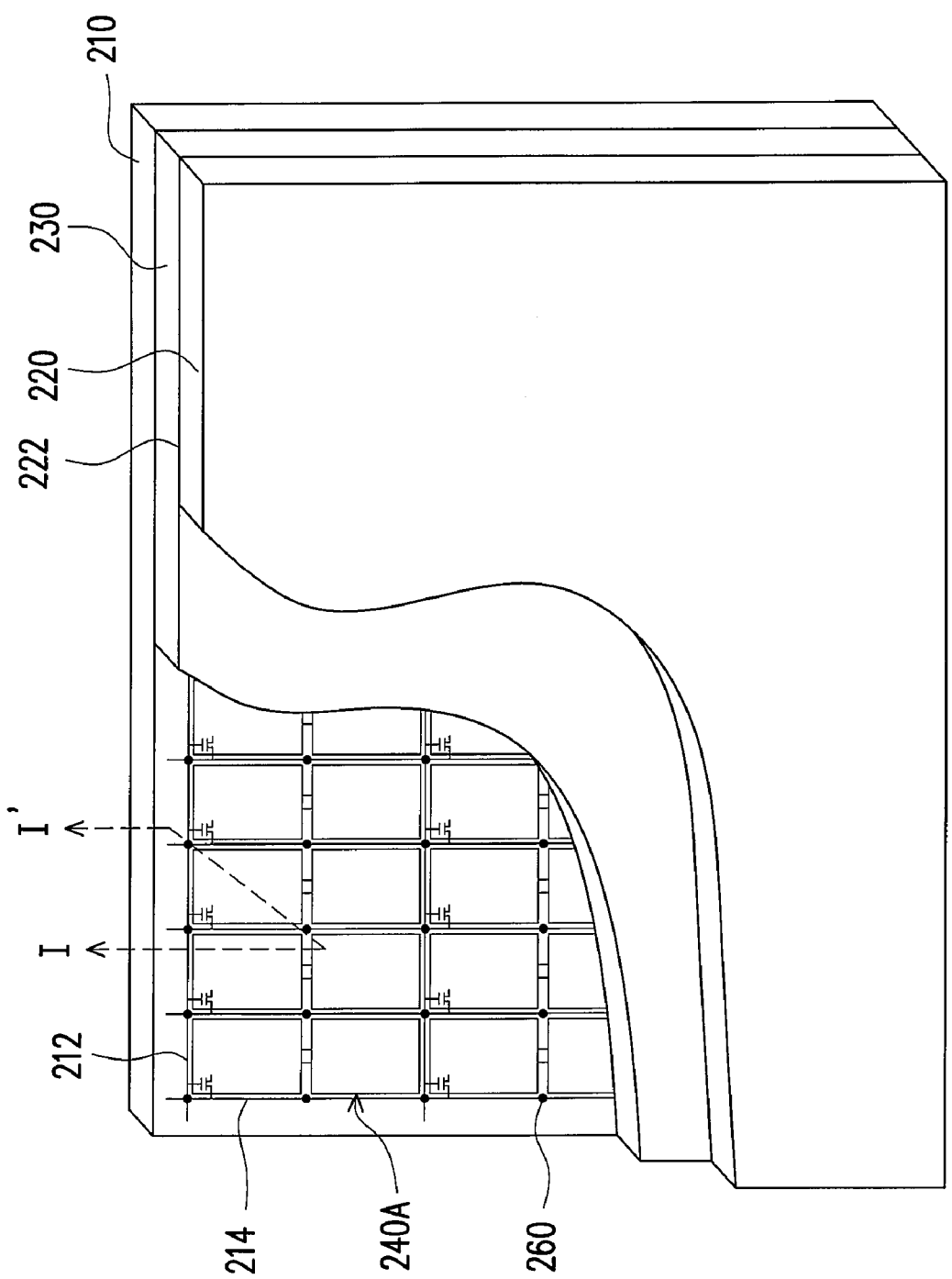
FIG. 2A illustrates an LCD panel according to a first embodiment of the present invention.
Figure 2B:
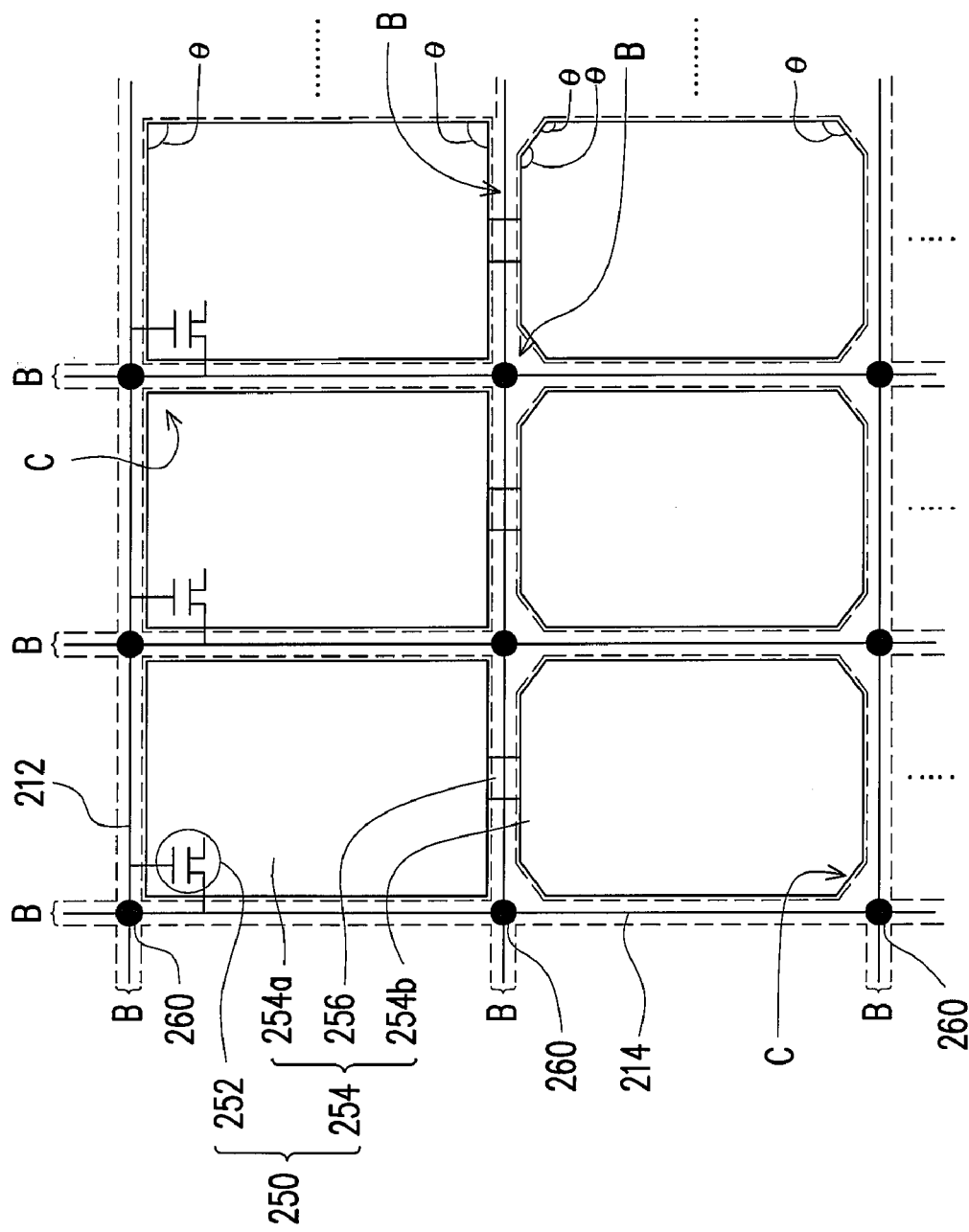
FIG. 2B illustrates a pixel array structure of the LCD panel in FIG. 2A.

FIG. 2A illustrates a liquid crystal display (LCD) panel according to a first embodiment of the present invention, and FIG. 2B illustrates a pixel array structure of the LCD panel in FIG. 2A. Referring to FIG. 2A, the LCD panel 200 includes a first substrate 210, a second substrate 220, a liquid crystal layer 230, and a pixel array structure 240A. The first substrate 210 includes a plurality of scan lines 212 and a plurality of data lines 214, and the second substrate 220 includes a common electrode 222. The liquid crystal layer 230 is disposed between the first substrate 210 and the second substrate 220.

Referring to FIG. 2B, the pixel array structure 240A includes a plurality of pixel units 250 and a plurality of protrusions 260. The pixel units 250 are arranged as an array and are electrically connected to the corresponding scan lines 212 and data lines 214, and each pixel unit 250 includes an active device 252 and a pixel electrode 254 electrically connected to the active device 252, wherein the pixel electrode 254 has a plurality of electrode sections electrically connect the active device 252. In FIG. 2B, the pixel electrode 254 may have an electrode section 254a and an electrode section 254b. Besides, the protrusions 260 are substantially located in at least one junction region B of the electrode sections 254a and the electrode sections 254b. In other words, the protrusions 260 are located between the adjacent electrode sections 254a and electrode sections 254b. To be specific, in the present embodiment, the junction region B refers to an area between each electrode section 254a or electrode section 254b and another adjacent electrode section 254a or electrode section 254b. Furthermore, there is a junction region B between any two adjacent electrode sections 254a, 254b, and there is also a junction region B between any four electrode sections 254a and electrode sections 254b arranged as a rectangle.

Referring to both FIG. 2A and FIG. 2B, each of the protrusions 260 in the junction region B between any four adjacent electrode sections 254a and electrode sections 254b arranged as a rectangle may be adjacent to the corner C of the electrode sections 254a and 254b, and the protrusions 260 may be a plurality of tapered protruding structures. Furthermore, the protrusions 260 may be disposed above the data lines 214, and four adjacent electrode sections 254a and 254b may surround one protrusion 260. In addition, the protrusions 260 in FIG. 2B may be circular tapered protruding structures, rectangular tapered protruding structures, triangular tapered protruding structures, or other polygonal tapered protruding structures.

According to the physical characteristic of liquid crystal molecules, when the protrusions 260 are disposed, the liquid crystal molecules automatically line up along the edges of the protrusions 260. Thus, when a single point of the LCD panel 200 is pressed, the disordered liquid crystal molecules would line up along the edges of the protrusions 260 because of the physical characteristic thereof. In the present embodiment, the protrusions 260 are disposed adjacent to the corners C of various electrode sections 254a and 254b in order to affect the arrangement of the liquid crystal molecules from the corners C. Accordingly, when a single point of the LCD panel 200 is pressed, the disordered liquid crystal molecules can resume their original arrangement quickly. Furthermore, with the disposition of the protrusions 260, the display quality of the LCD panel 200 is improved. On the other hand, the protrusions 260 are disposed on the scan lines 214 but not in the display area, thus, the ambiguous arrangement direction of the liquid crystal molecules around the protrusions 260 will not affect the aperture ratio of the display area. However, the protrusions 260 may also be disposed corresponding to other light-shielding metals or light-shielding layers in order to maintain the display area aperture ratio of the LCD panel.

Referring to FIG. 2A and FIG. 2B again, generally speaking, a voltage is supplied to the pixel electrode 254 when the LCD panel 200 displays an image. The voltage difference between the first substrate 210 and the second substrate 220 at the pixel electrode 254 is different from that at other areas. In other words, the electric field from the center to the edge of the pixel electrode 254 is not consistent. Thus, the liquid crystal molecules in the liquid crystal layer 230 are arranged along the direction in which the electric field changes. The larger the pixel electrode 254 is, the smaller the change of the electric field from the center to the edge of the pixel electrode 254 is and accordingly the less the arrangement of the liquid crystal molecules is affected. Accordingly, in the pixel unit 250, the pixel electrode 254 is divided into a plurality of sections such that the distances between the edges of various electrode sections 254a and 254b to the center of the pixel electrode 254 are shortened. Accordingly, when the LCD panel 200 displays an image, the changes in the electric fields from the centers to the edges of various electrode sections 254a and 254b are increased so that the arrangement of the liquid crystal molecules can be easily controlled and the response speed of the liquid crystal molecules can be increased.

As shown in FIG. 2B, each of the electrode sections 254a and 254b may have a plurality of turning angles θ, and each of the turning angles θ is greater than or equal to 90° and is smaller than 180°. For example, the turning angle θ of the electrode section 254a is 90°, namely, the electrode section 254a is a rectangle, and the turning angle θ of the electrode section 254b is greater than 90°, namely, the electrode section 254b is a polygon but not a rectangle for example. The electrode section 254b is designed as a polygon, for example, by cutting off the four corners of a rectangle, such that the distance between the center and the edge of the electrode section 254b in the diagonal direction is shortened, and accordingly, the change in the electric field in the diagonal direction of the electrode section 254b is increased. In other words, the polygonal design of the electrode section 254b increases the response speed of the liquid crystal molecules. In the LCD panel 200 of the present embodiment, the response speed of the liquid crystal molecules can be effectively increased and a correct arrangement direction of the liquid crystal molecules can be ensured without having to dispose a slit in each of the pixel electrode 254. Thereby, the LCD panel 200 in the present invention can maintain a good display quality without losing the aperture ratio of the display area thereof.

Moreover, the pixel electrode 254 further has a connecting section 256 for connecting the adjacent electrode section 254a and electrode section 254b in the same pixel unit 250. The electrode section 254a and the electrode section 254b may be transparent electrodes, reflective electrodes, or the combination thereof. When the electrode section 254a and the electrode section 254b are both transparent electrodes, the connecting section 256 may also be transparent electrode. When one of the electrode section 254a and electrode section 254b is a transparent electrode and the other one is a reflective electrode, the connecting section 256 may be a reflective electrode or a transparent electrode, in which, the LCD panel 200 is called a transflective LCD panel. In addition, when one of the electrode section 254a and the electrode section 254b is a reflective electrode, the active device 252 may be disposed below the reflective electrode in order to increase the aperture ratio of the display area of the LCD panel 200.

Figure 2C:
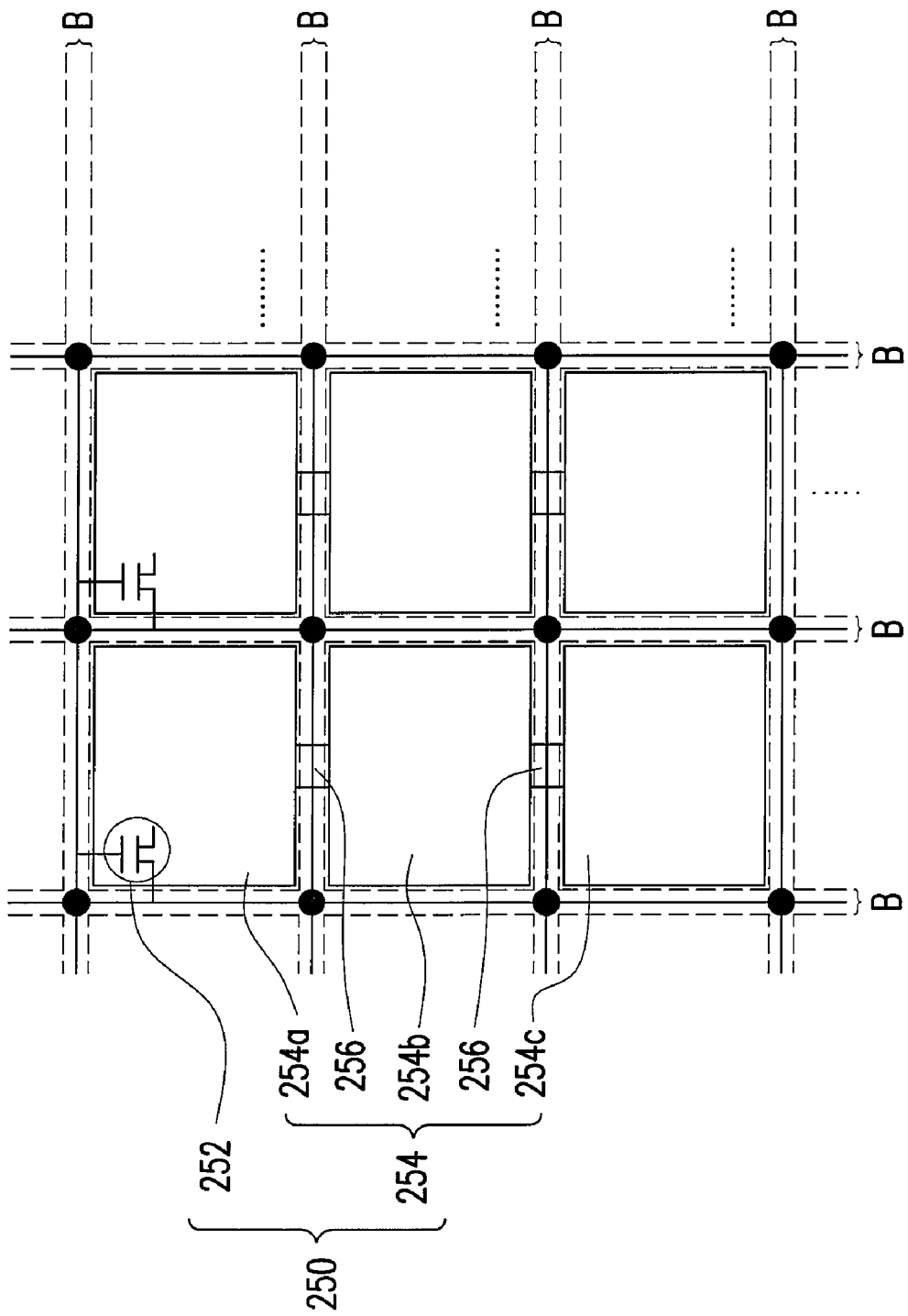
FIG. 2C illustrates another pixel array structure of the LCD panel in FIG. 2A.

However, in the present embodiment, the number of electrode sections in the pixel electrode 254 is not limited to 2, namely, the electrode section 254a and the electrode section 254b. For example, in the pixel array structure 240B illustrated in FIG. 2C, each pixel electrode 254 has three electrode sections such as electrode section 254a, electrode section 254b, and electrode section 254c. Meanwhile, in each pixel electrode 254, there is a connecting section 256 between every two adjacent electrode sections, between electrode section 254a and electrode section 254b and between electrode section 254b and electrode section 254c, to connect the electrode sections.

In another embodiment of the present invention, each pixel unit 250 may have more electrode sections. When the pixel electrode 254 is divided into multiple electrode sections, the distance between the center to the edge of each electrode section is shortened so that the change in the electric field is increased and accordingly the response speed of the liquid crystal molecules is further increased.

Figure 2D:
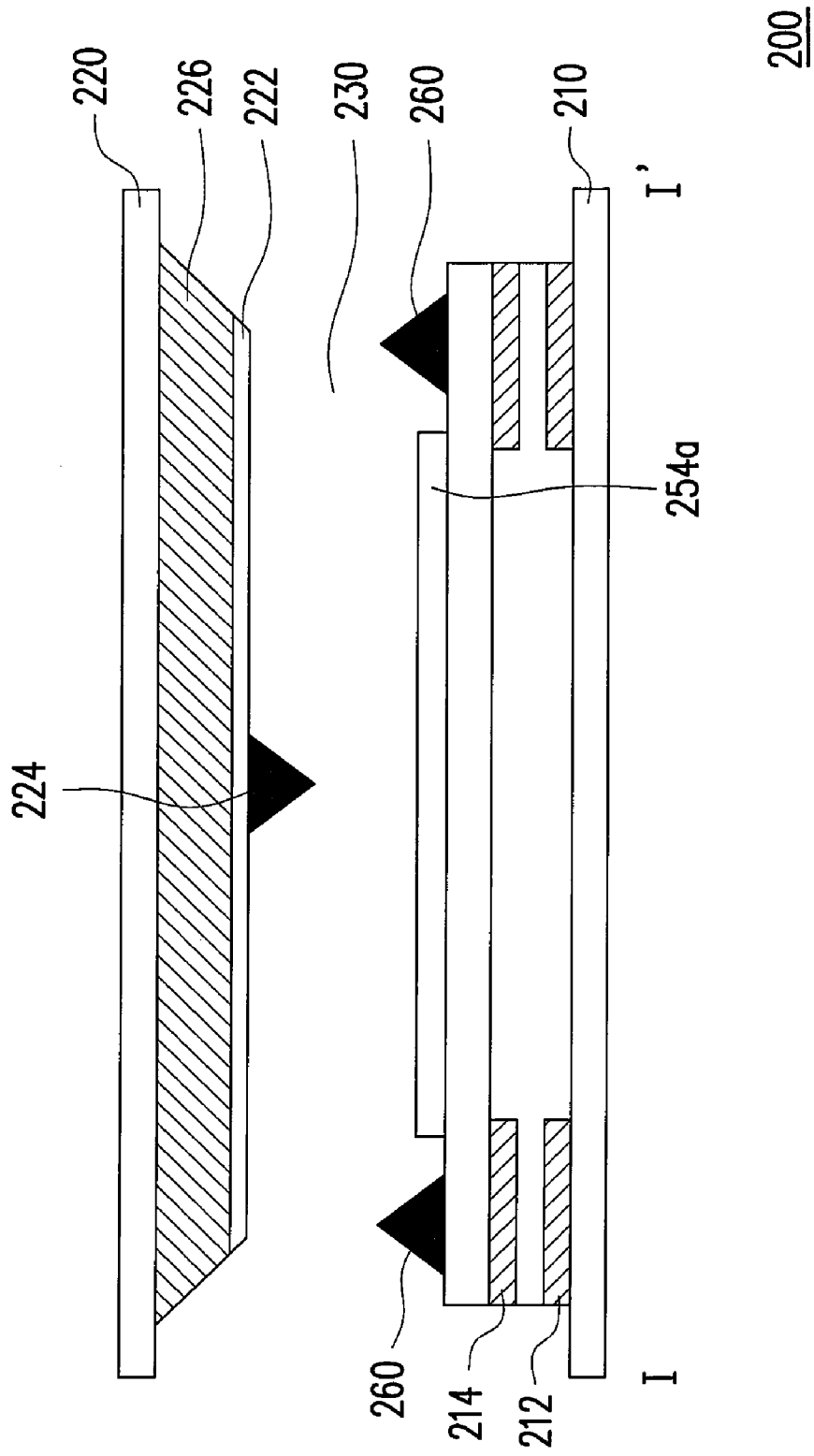
FIG. 2D is a cross-sectional view of the LCD panel in FIG. 2A cut along line A-A'.

FIG. 2D is a cross-sectional view of the LCD panel in FIG. 2A cut along line A-A'. Referring to FIG. 2D, the LCD panel 200 further includes a plurality of alignment structures 224 disposed on the second substrate 220. The alignment structures 224 may be correspondingly to the centers of the electrode sections 254a. The alignment structures 224 may be protruding structures and the protruding structures are respectively corresponding to the centers of the electrode sections. In the LCD panel 200, the alignment structures 224 align the liquid crystal molecules in the electrode sections 254a in various alignment directions so as to achieve the wide viewing angle effect. Meanwhile, the LCD panel 200 may further include a color filter 226 disposed on the second substrate 220 to achieve colorful display.

In other embodiments of the present invention, the common electrode 222 may have a plurality of openings (not shown), and the openings are respectively corresponding to the centers of the electrode sections 254a and 254b (as the positions of the alignment structures 224 in FIG. 2D, wherein the alignment structures 224 are replaced by the openings) so that the liquid crystal molecules in the electrode sections 254a can present multi-domain alignment and further wide viewing angle display can be achieved. To be specific, the LCD panel 200 may further include a plurality of spacers (not shown) for sustaining the distance (i.e. cell gap) between the first substrate 210 and the second substrate 220. The spacers may be ball spacers or photo spacers, and the spacers may be disposed above the scan lines 212 or the data lines 214 so that the spacers will not affect the aperture ratio of the display area. In addition, when one of the electrode sections 254a and 254b is a reflective electrode, the spacers may also be disposed above the reflective electrode.

Second Embodiment

Figure 3:
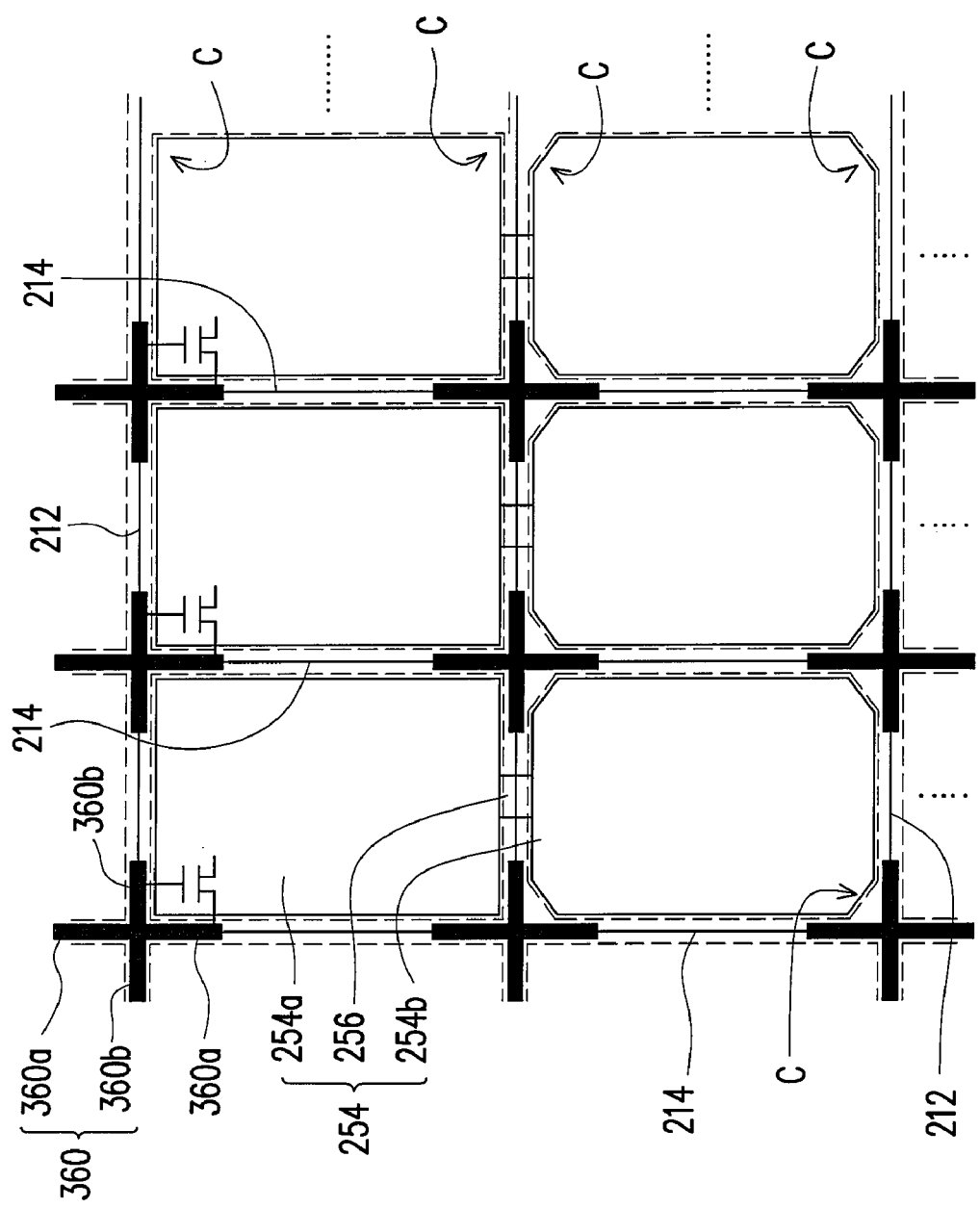
FIG. 3 illustrates a pixel array structure according to a second embodiment of the present invention.

The pixel array structure provided by the present invention is not limited to the pattern described in foregoing embodiment; instead, the pixel array structure in the present invention may have many varieties. FIG. 3 illustrates a pixel array structure according to a second embodiment of the present invention. Referring to FIG. 3, in the present embodiment, the pixel array structure 340 is similar to the pixel array structure 240A in the first embodiment. The difference between the two is that in pixel array structure 340, the protrusions 360 disposed adjacent to the corners C of the electrode sections 254a and 254b are a plurality of cross protruding structures.

As shown in FIG. 3, the protrusions 360 may be located between four adjacent electrode sections 254a and electrode sections 254b which are arranged as an rectangle, and each of the protrusions 360, i.e. the cross protruding structures, has a vertical portion 360a parallel to the data lines 214 and a horizontal portion 360b interlacing to the data lines 214. Protrusions 360 are disposed separately with each other for example. The vertical portion 360a and the horizontal portion 360b may be extended from the corners C to a junction region B between two adjacent electrode section 254a and electrode section 254b. The vertical portion 360a and the horizontal portion 360b allow the liquid crystal molecules to be arranged around the protrusions 360 and tilt towards the centers of the electrode sections 254a and the electrode sections 254b. Thus, when the pixel array structure 340 is applied to a LCD panel, the protrusions 360 in the cross protruding structures ensure a correct arrangement direction of the liquid crystal molecules in the LCD panel. In other words, by applying the pixel array structure 340 into the LCD panel, the response speed of the liquid crystal molecules in the LCD panel is increased, and when the liquid crystal molecules are disordered by any disturbance, the liquid crystal molecules can quickly resume their original arrangement direction under the affection of the protrusions 360. Moreover, in the pixel array structure 340, the electrode sections 254a and the electrode sections 254b may be respectively rectangular or polygonal according to different design requirement. Furthermore, the pixel electrode 254 may have three or more electrode sections.

Third Embodiment

In the present invention, a pixel electrode is divided into a plurality of electrode sections. The present embodiment provides another protrusion disposition pattern in order to adjust the tilting direction of the liquid crystal molecules in the junction region between the electrode sections of a single pixel electrode.

Figure 4A:
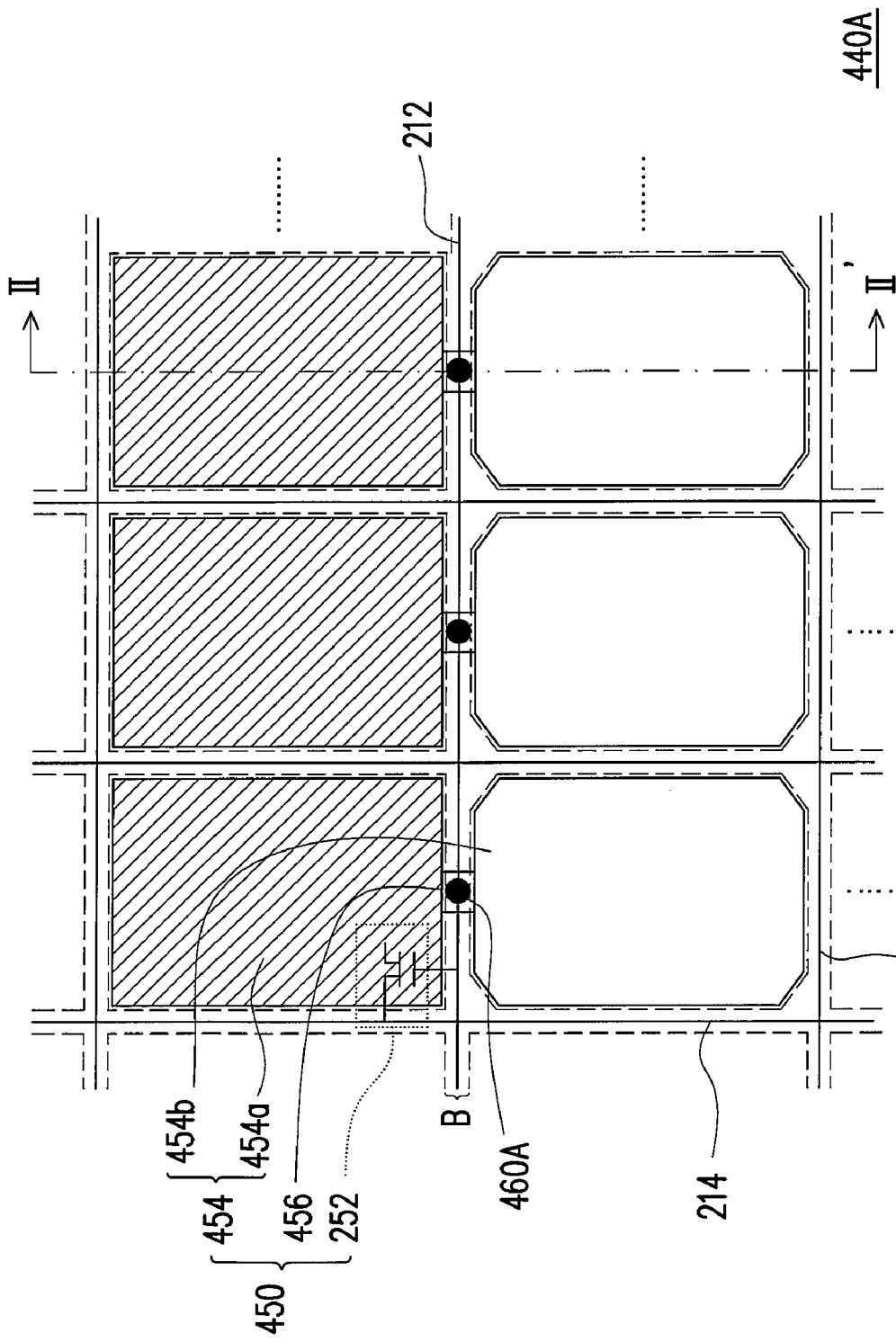
FIG. 4A illustrates a pixel array structure according to a third embodiment of the present invention.

FIG. 4A illustrates a pixel array structure according to a third embodiment of the present invention. Referring to FIG. 4A, the pixel array structure 440A is similar to the pixel array structure 240A in the first embodiment, and the only difference between the two is that in each pixel unit 450 of the pixel array structure 440A, the protrusions 460A may be located at the center of the junction region B between the adjacent electrode section 454a and electrode section 454b. In addition, the scan line 212 corresponding to each pixel unit 450 may be located between the adjacent electrode section 454a and electrode section 454b of the pixel unit 450. The electrode section 454a may be a reflective electrode and the electrode section 454b may be a transparent electrode.

Figure 4B:
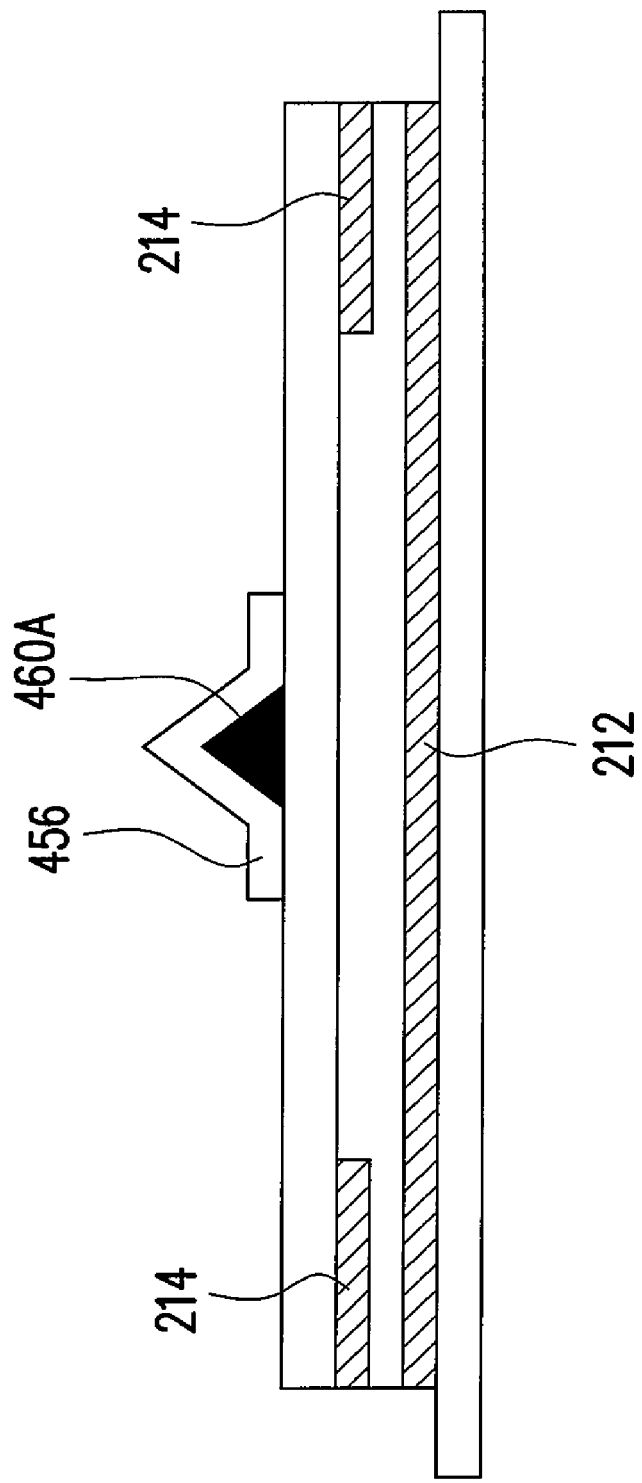
FIG. 4B is a cross-sectional view of a pixel unit in FIG. 4A cut along the extended direction of a scan line 212.
Figure 4C:
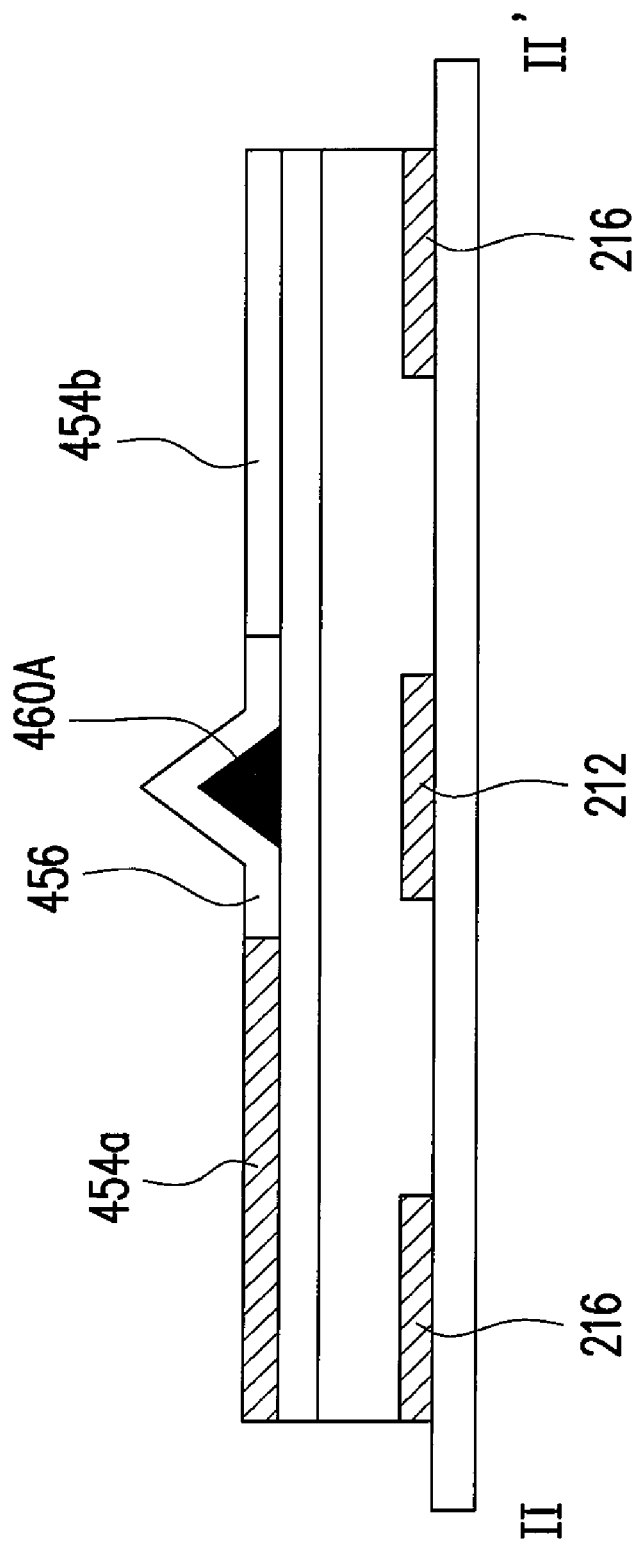
FIG. 4C is a cross-sectional view of the pixel unit in FIG. 4A cut along line II-II'.

FIG. 4B is a cross-sectional view of the pixel unit 450 in FIG. 4A cut along the extended direction of a scan line 212, and FIG. 4C is a cross-sectional view of the pixel unit 450 in FIG. 4A cut along line II-II'. Referring to both FIG. 4B and FIG. 4C, in a single pixel unit 450, the protrusion 460A between the adjacent electrode section 454a and electrode section 454b may be a tapered protruding structure. In addition, the connecting electrode 456 may cover or overlap the protrusion 460A and may be a transparent electrode. Moreover, the common electrode 216 is parallel to the scan lines 212.

When the pixel unit 450 is applied to an LCD panel, the liquid crystal molecules will line up around the protrusion 460A. Thus, the liquid crystal molecules around the protrusion 460A and close to the electrode section 454a tilt towards the center of the electrode section 454a, and the liquid crystal molecules close to the electrode section 454b tilt towards the center of the electrode section 454b. In other words, the protrusion 460A allows the liquid crystal molecules around the connecting electrode 456 to tilt towards the center of the electrode section 454a or the electrode section 454b, and accordingly the display quality of the LCD panel is improved.

In another embodiment of the present invention, if the pixel array structure 440A is applied to an LCD panel, a plurality of common electrodes 216 may be disposed on the pixel array substrate, and these common electrodes 216 may be correspondingly disposed between the adjacent electrode section 454a and the electrode section 454b of each pixel unit 450. In another embodiment of the present invention, the common electrodes 216 may be disposed below the protrusion 460A and parallel to the scan lines 212. In addition, light leakage may be caused at where the protrusion 460A is when the liquid crystal molecules line up around the protrusion 460A, thus, the connecting section 456 on the protrusion 456 may be a reflective electrode. In other words, the electrode section 454a, the electrode section 454b, and the connecting section 456 may be all reflective electrode, all transparent electrodes, or the combination of reflective electrodes and transparent electrodes.

Figure 5:
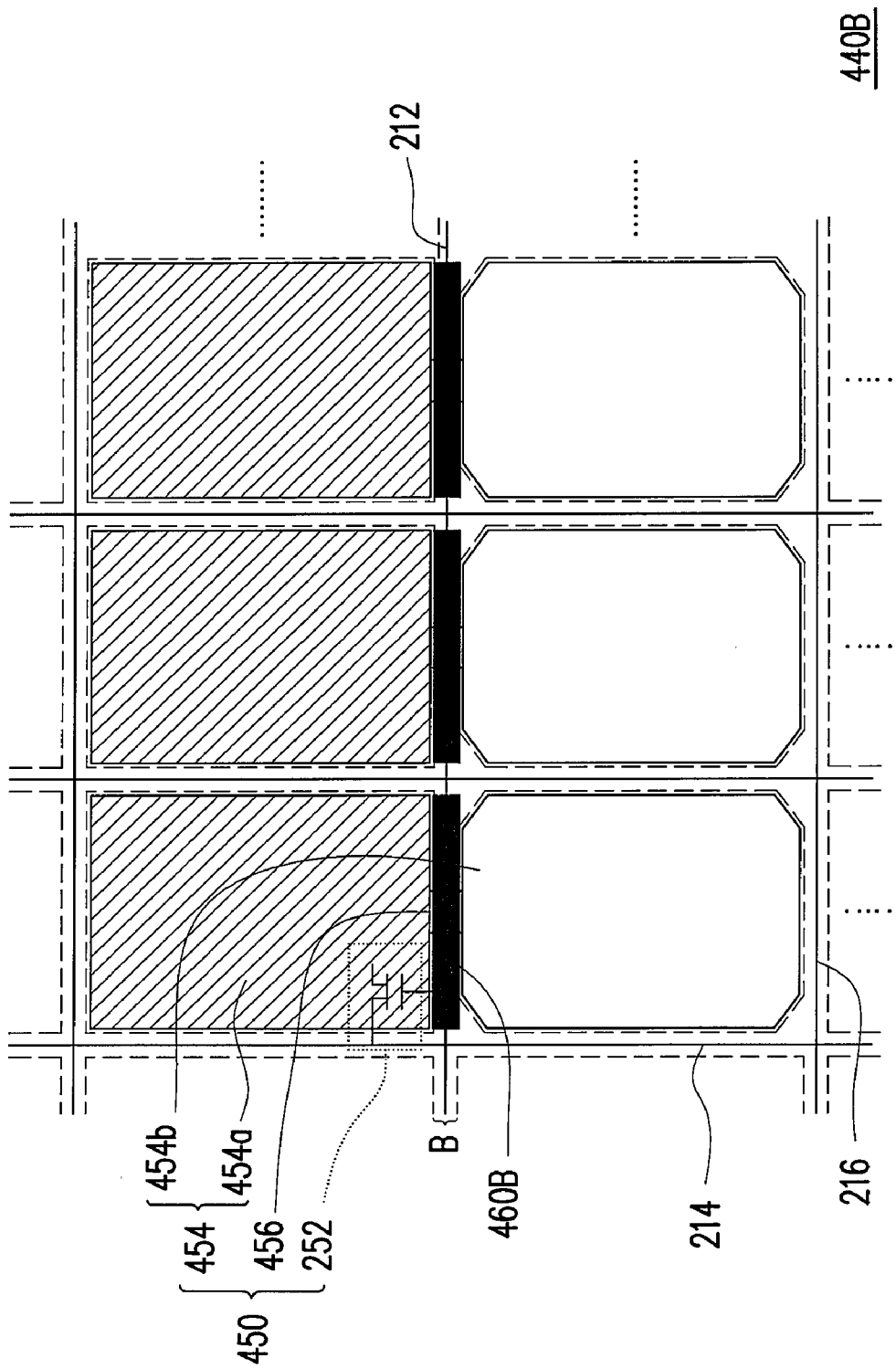
FIG. 5 and FIG. 6 illustrate another two protrusions according to the third embodiment of the present invention.
Figure 6:
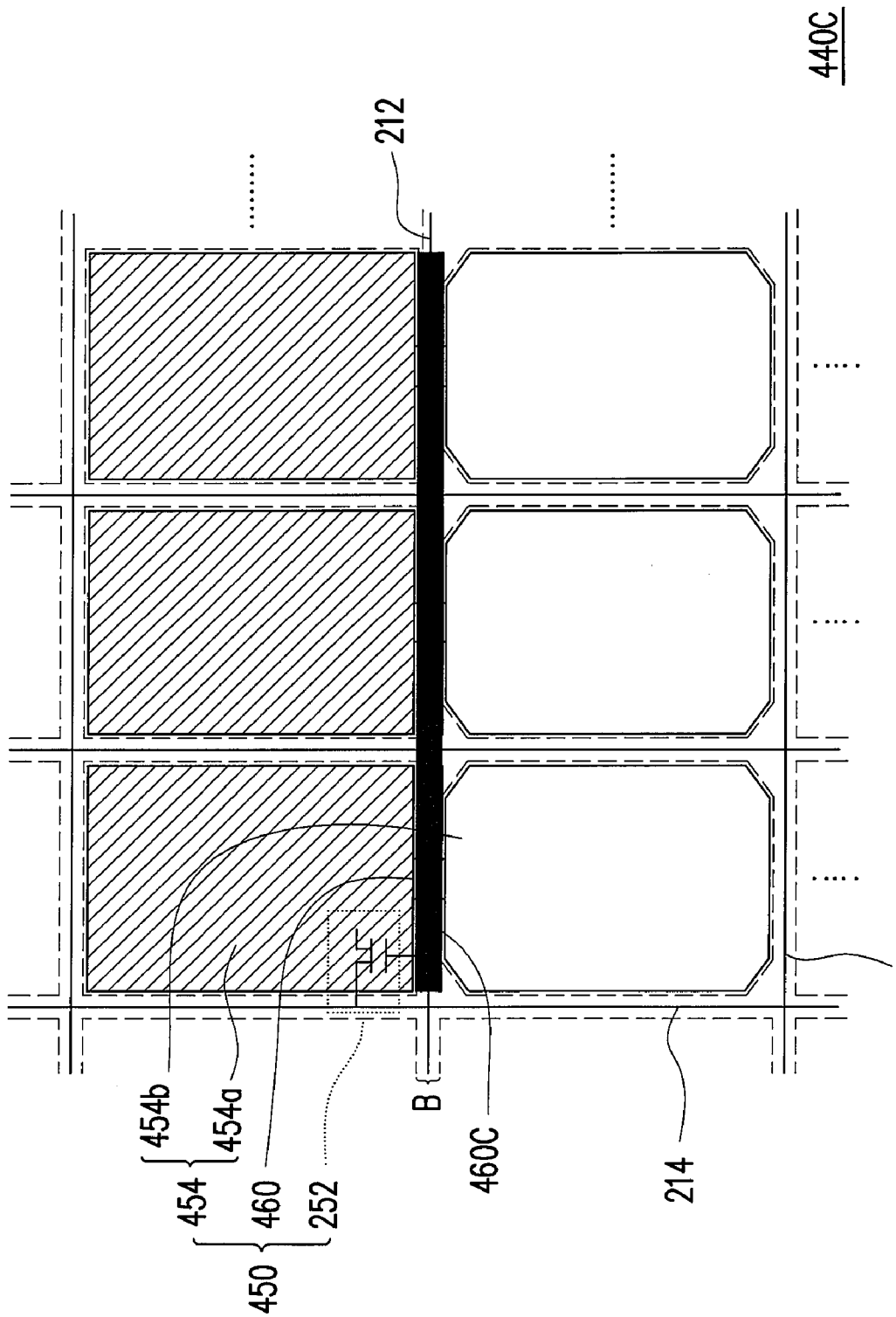

In addition, the protrusion 460A located between the adjacent electrode section 254a and electrode section 254b in the single pixel unit 450 is not limited to a tapered protruding structure. FIG. 5 and FIG. 6 illustrate another two protrusions according to the third embodiment of the present invention. Referring to FIG. 5 and FIG. 6, in the pixel array structure 440B and the pixel array structure 440C, the protrusion 460B and the protrusion 460C may be protruding bars. The protrusion 460B may be located in the pixel unit 450 and above the scan lines 212 but not intersect with the data lines 214, and the protrusion 460C in protruding bars may cross over a plurality of data lines 214 and span over a plurality of pixel units 450. Here all the protrusion 460B, the protrusion 460C, and the protrusion 460A of tapered protruding structure can help to arrange the liquid crystal molecules. Furthermore, the protrusions 460A, 460B, and 460C in the present embodiment may be disposed in the same pixel array structure together with the protrusions 260 and 360 described in the first and the second embodiment of the present invention.

In overview, the pixel array structure and LCD panel provided by the present invention have at least following advantages. In the LCD panel and pixel array structure provided by the present invention, the disposition of a plurality of protrusions helps to ensure the correct arrangement direction of the liquid crystal molecules and allows the liquid crystal molecules to resume their original arrangement direction quickly when they are disordered. Meanwhile, the protrusions are disposed in at least one junction region of the electrode sections so that the aperture ratio of the display area of the LCD panel is not affected. Moreover, in the present invention, a single pixel electrode is divided into a plurality of electrode sections to shorten the distance between the edge and the center of the pixel electrode and increase the change in the electric field in the diagonal direction of the pixel electrode, and accordingly the response speed of the liquid crystal molecules is increased. Accordingly, when a single point of the LCD panel provided by the present invention is pressed, the liquid crystal molecules can quickly resume their original arrangement so that the display quality of the LCD panel is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel array structure, comprising:
a plurality of pixel units, arranged as an array, each of the pixel units comprising:
an active device; and
a pixel electrode electrically connected to the active device, the pixel electrode having a plurality of electrode sections; and
a plurality of protrusions, substantially located in at least one junction region of the electrode sections.

2. The pixel array structure according to claim 1, wherein each of the electrode sections has a plurality of turning angles, and each of the turning angles is about greater than or equal to 90° and is smaller than 180°.

3. The pixel array structure according to claim 1, wherein each of the protrusions is adjacent to a corner of the electrode section.

4. The pixel array structure according to claim 1, wherein the protrusions are a plurality of tapered protruding structures or a plurality of cross protruding structures.

5. The pixel array structure according to claim 1, wherein for each of the pixel units, the protrusions are located at the center of the junction region of two adjacent electrode sections.

6. The pixel array structure according to claim 5, wherein each of the protrusions is a tapered protruding structure or a protruding bar.

7. The pixel array structure according to claim 1, wherein the pixel electrode further has a connecting section for connecting two adjacent electrode sections.

8. The pixel array structure according to claim 1, wherein the electrode sections are transparent electrodes, reflective electrodes, or the combination of transparent electrodes and reflective electrodes.

9. A liquid crystal display (LCD) panel, comprising:
a first substrate, comprising a plurality of scan lines and a plurality of data lines;
a second substrate, comprising a common electrode;
a liquid crystal layer, disposed between the first substrate and the second substrate; and
a pixel array structure, comprising:
a plurality of pixel units, disposed on the first substrate as an array, each of the pixel units comprising:
an active device; and
a pixel electrode electrically connected to the active device, the pixel electrode having a plurality of electrode sections, and the active device electrically connecting the scan line and the data line corresponding to the pixel unit; and
a plurality of protrusions, disposed on the first substrate and located in at least one junction region of the electrode sections.

10. The LCD panel according to claim 9, further comprising a plurality of alignment structures disposed on the second substrate.

11. The LCD panel according to claim 10, wherein the alignment structures are respectively corresponding to the centers of the electrode sections.

12. The LCD panel according to claim 9, wherein the common electrode has a plurality of openings, and the openings are respectively corresponding to the centers of the electrode sections.

13. The LCD panel according to claim 9, further comprising a color filter disposed on the second substrate.

14. The LCD panel according to claim 9, wherein each of the electrode sections has a plurality of turning angles, and each of the turning angles is greater than or equal to 90° and is smaller than 180°.

15. The LCD panel according to claim 9, wherein the protrusions are located on the data lines and are respectively corresponding to the corners of the electrode sections.

16. The LCD panel according to claim 9, wherein the protrusions are a plurality of tapered protruding structures or a plurality of cross protruding structures.

17. The LCD panel according to claim 9, wherein in each of the pixel units, the protrusions are located at the center of the junction region of two adjacent electrode sections.

18. The LCD panel according to claim 17, wherein each of the protrusions is a protruding bar and the protruding bars are interlacing to the data lines.

19. The LCD panel according to claim 9, wherein the scan line corresponding to each of the pixel units is located between two adjacent electrode sections of the pixel unit.

20. The LCD panel according to claim 9, wherein the electrode sections are transparent electrodes, reflective electrodes, or the combination of transparent electrodes and reflective electrodes.

* * * * *